Nov. 9, 1926.

C. H. USHER

TIRE RIM TOOL

Filed May 18, 1925

1,606,543

INVENTOR.
Charles H. Usher
BY Chapin & Neal
ATTORNEYS.

Patented Nov. 9, 1926.

1,606,543

UNITED STATES PATENT OFFICE.

CHARLES H. USHER, OF CHICOPEE FALLS, MASSACHUSETTS.

TIRE-RIM TOOL.

Application filed May 18, 1925. Serial No. 31,027.

This invention relates to an improved automobile tool particularly designed for contracting a split rim to take it away from a tire or to expand such a rim to position to hold a tire at the time of a tire change. The work of changing tires is frequently done on the road, and one feature of my invention relates to a novel construction by which the great force often required in contracting split rims may be easily supplied by a relatively light and compact tool which will be suitable for the tool kit carried in the automobile. Prior art structures, of which I am aware, apply the force to the rim in an unbalanced and relatively inefficient manner if they are of light weight construction and, therefore, will not work well. When they are of heavy construction employing the ordinary lifting jack mechanism they unduly burden the ordinary tool kit.

The means by which I may more efficiently accomplish such work where a large force is required, by a relatively light weight tool, as compared to prior art structures will appear from the description of the invention in its preferred form.

Fig. 1 is a plan view of a tire rim tool having its rim engaging members hooked over the edge of a rim that is in slightly contracted form;

Fig. 2 is a sectional elevational view on a larger scale taken on line 2—2 of Fig. 1; and showing the method of connecting the various members according to the novel features of my invention;

Fig. 3 is an elevational view showing one of the rim engaging members extending over the outer periphery of the rim;

Fig. 4 is a similar view showing the member in engagement with the inner periphery of the rim;

Fig. 5 is a plan view showing the device in a collapsed relation; and

Fig. 6 is a detail view of the driving pin for the power applying mechanism.

Referring to Fig. 1 the tool is generally operated by hooking the ends of members 1, 2 and 3 over the edge of a rim R and by turning handle 4 clockwise the rack member 3 is pulled in radially to break the rim away from its tire. By turning handle 4 oppositely, the rim may be forced outwardly to circular form for the tire, in which position it is usually locked. To accomplish this operation efficiently and with a light weight structure I start with a square pin 6. A gear 9 with a square central opening, fitting pin 6 is mounted centrally of the pin for rack driving purposes. With the gear 9 I mount on opposite sides thereof the two bushings 8 having square central openings like the gear to slide on and fit pin 6. A yoke member 7 is mounted to pivot freely on bushings 8 and straddle gear 9 as shown. Between the neck of the yoke 7 and gear 9 the rack member 3 is mounted to move back and forth with its teeth T engaging the gear so that the yoke insures the proper relation of the rack and gear. The inner ends of members 1 and 2 are mounted for free swinging movement on the bushings 8, one on each side of the yoke member 7. On one outer end of the square pin 6 the handle 4 engages the pin like a wrench with a square opening filled by the pin as shown in Fig. 2. For convenience in holding the parts in assembled relation, pin 6 may be provided with an integral head on the handle side and a washer 10 with cotter pin 11 on the opposite side, as shown in Fig. 2.

From Fig. 2 the nice balance of the forces acting in operation will be clear. As handle 4 turns pin 6, gear 9 engages rack 3 to apply the force through the rack. Arm 1 on one side of gear 9 and arm 2 on the other side provide balanced anchorages from which the gear and rack may work. As arm 3 is drawn through yoke 7, its angular position changes but without possibility of any cramping action in the parts, because the yoke pivots freely on bushings 8. This centralized balanced relation of the parts in a tire rim tool of the class described constitutes one of the principal features of my invention.

The members 1, 2, 3 and 4 are preferably made of strap iron or steel in the form shown. Because of the balanced means employed for applying the force these members may be of much lighter construction than would be suitable in other structures with a different mode of operation. Each of the members 1, 2 and 3 is provided at its outer ends with a hook portion 5 and a spaced plug 5' so as to engage the rim R as the force is applied in opposite directions to the rim. The handle member 4 is provided with a convenient knob at its outer end on one side and a plug 12 with a flanged head 13 on the opposite side all as shown in Fig. 3 for example. The teeth T on member 3 do not extend to the inner end so that there is no danger, after the parts are assembled, of member 3 leaving its yoke 7, because the gear 9 cannot ride over the end of the rack member.

The tool may be normally carried in collapsed or closely folded condition as indicated in Fig. 5 where it occupies little space and is not a heavy burden for the tool kit. In use the strap members 1, 2, and 3 are hooked over the rim at spaced points and handle 4 is turned. As indicated in Fig. 1 there is a common pivot axially of the driving pin 6 for all the parts. This driving pin is preferably made square to avoid the weakness of a key. All the forces applied are centralized on the square pin. The handle 4 normally bends upwardly to a slight degree or may readily be bent enough for plug 12 and its head to clear members 1, 2 and 3 as the handle turns. The rotation of the handle may pull the rim inwardly as indicated in Fig. 1 or push it outwardly as indicated in Fig. 4. When the rim has been pulled inwardly far enough to clear it from the tire, the handle 4 may be turned enough or the adjacent member as 3 may be pulled toward the handle so that by pressing the handle 4 downwardly it may be locked in place with flanged head 13 hooked under the edge of member 3. The resiliency of the rim tends to turn handle 4 backwardly and this engagement of the head 13 with member 3 holds it in locked position. The whole rim R with the tool may then be lifted as a unit in the assembly as shown in Fig. 1 just as if the tool arms were spokes fastened to the rim. This feature makes the work of changing the rim from one tire to another easier than it otherwise would be. From the position indicated in Fig. 1, handle 2 may be unlocked and turned counter-clockwise to expand the rim to proper assembly with a tire casing. Fig. 4 shows the way of pushing the rim when it is to be assembled with the tire.

From the foregoing description it is clear that the tool is particularly suitable for the work it is to do. The arms may be hooked on the rim practically anywhere without affecting the leverages employed for the work.

Having described my invention in its preferred form, I desire to claim it as broadly as the law will permit and more specifically in respect to some of its preferred features.

What I claim is:

1. A collapsible rim tool comprising a pivot member, a series of arms each pivoted for free rotation about said member and one of them arranged for sliding movement independently of its pivotal movement, a power multiplying means rotatably mounted on said pivot member and operably engaging one of said arms to slide it substantially radially of a rim, said arms having rim engaging means at the outer ends thereof.

2. A collapsible rim tool comprising a driving shaft, a gear fixed on said shaft, a rack bar engaged by said gear at one end and provided with rim engaging means at the other end, means to guide said bar for pivotal movement about said shaft, rim engaging arms pivotally mounted on the shaft, one on each side of said gear, and a handle to turn said shaft.

3. A collapsible rim tool comprising a flat sided pivot pin, a gear with a central opening to receive said pin, a bushing on each side of said gear, a U shaped guiding member with its legs pivoted on said bushings to straddle the gear, a rim engaging rack bar straddled by the guiding member and with teeth engaged by the gear, a pivoted rim engaging arm mounted on each of said bushings, a handle fixed to said pin outside of one of said arms, all constructed and arranged for said bar and arms to engage a split tire rim to collapse or expand it in tire changing work.

4. A collapsible tire rim tool comprising three flat arms having rim engaging ends and all mounted to swing freely about a common pivot pin, a pivot pin for said arms, a gear fixed on the pin in the plane of one arm and between the planes of the other arms, said arm in the plane of the gear being provided with teeth engaged with said gear and means to hold the arm in driving position for the gear, and a handle to turn said pivot pin.

5. A collapsible tire rim tool comprising a series of rim engaging arms mounted to turn about a common pivot pin, a pivot pin provided with power multiplying means to move one of said arms substantially radially of a rim, a rotatable handle included in said power multiplying means, and a device on the handle adapted to hook under one of said arms and lock the power multiplying means from movement in one direction.

6. A tire rim tool comprising, rim engaging members pivotally connected on a common pivotal axis, one of said members being slidable to shorten the distance from its pivot and its rim and means located at said axis for actuating said slidable member.

7. A tire rim tool comprising rim engaging members and an operating lever pivotally connected on a common pivotal axis all in substantially radial arrangement, one of said members being slidable relative to its pivotal axis and means associated with said lever and slidable member for actuating said member.

8. A tire rim tool comprising, rim engaging members and an operating lever pivoted upon a common pivot all in substantially radial arrangement, one of said members being slidable relative to said pivot, an actuating member therefor mounted on said pivot and operable by said lever for actuating said slidable member.

9. A tire rim tool comprising, rim engaging and operating members pivotally connected on a common pivotal axis, a support pivoted on said axis, a rim engaging member slidable in said support and means associated with said operating member for actuating said slidable member.

10. A tire tool comprising, a central shaft, an operating lever fixed thereon, rim engaging members rotatable on said shaft and all arranged in substantially radial directions from the shaft, one of said members being slidable with respect thereto, and means associated with said operating lever and slidable member for actuating said member.

11. A tire tool comprising, a central shaft, an operating lever and a pinion gear non-rotatable thereon, rim engaging members rotatable on said shaft, one of said members being slidable with respect thereto and having a portion in engagement with said pinion, whereby as the pinion is rotated by the lever the member is moved in a substantially radial direction with respect to the rim engaged.

In testimony whereof I have affixed my signature.

CHARLES H. USHER.